United States Patent [19]
Weiss

[11] Patent Number: 4,998,279
[45] Date of Patent: Mar. 5, 1991

[54] METHOD AND APPARATUS FOR PERSONAL VERIFICATION UTILIZING NONPREDICTABLE CODES AND BIOCHARACTERISTICS

[76] Inventor: Kenneth P. Weiss, 7 Park Ave., Newton, Mass. 02150

[21] Appl. No.: 298,039

[22] Filed: Jan. 18, 1989

Related U.S. Application Data

[63] Continuation-in-part of Ser. No. 802,579, Nov. 27, 1985, Pat. No. 4,885,778, which is a continuation-in-part of Ser. No. 676,626, Nov. 30, 1984, Pat. No. 4,720,860.

[51] Int. Cl.$^5$ .......................... H04K 1/02; H04L 9/20; G07F 7/08
[52] U.S. Cl. .......................... 380/23; 380/25; 380/28; 340/825.31; 340/825.34; 235/380; 235/382
[58] Field of Search .......................... 340/825.31, 825.34; 380/3-5, 23-25, 28; 364/200, 900; 235/379, 380, 382

[56] References Cited

U.S. PATENT DOCUMENTS

| | | |
|---|---|---|
| 3,752,904 | 8/1973 | Waterbury .......................... 380/24 X |
| 3,764,742 | 10/1973 | Abbott et al. .......................... 380/23 |
| 3,806,874 | 4/1974 | Ehrat .......................... 380/23 |
| 3,886,451 | 5/1975 | Chu et al. .......................... 368/118 |
| 3,900,867 | 8/1975 | Wagner .......................... 342/45 |
| 3,995,111 | 11/1976 | Tsuji et al. .......................... 375/109 |
| 4,104,694 | 8/1978 | Hargrove .......................... 361/172 |
| 4,126,761 | 11/1978 | Graupe et al. .......................... 380/28 |
| 4,145,568 | 3/1979 | Ehrat .......................... 380/47 |
| 4,145,569 | 3/1979 | Ehrat .......................... 380/48 |
| 4,185,166 | 1/1980 | Kinch, Jr. et al. .......................... 380/43 |
| 4,193,073 | 3/1980 | Kohnen .......................... 342/56 |
| 4,277,837 | 7/1981 | Stuckert .......................... 364/900 |
| 4,295,039 | 10/1981 | Stuckert .......................... 235/380 |
| 4,302,810 | 11/1981 | Bouricius et al. .......................... 380/24 |
| 4,320,387 | 3/1982 | Powell .......................... 340/825.34 |
| 4,326,098 | 4/1982 | Bouricius et al. .......................... 380/25 |
| 4,403,114 | 9/1983 | Sakoe .......................... 381/42 |
| 4,471,216 | 9/1984 | Herve .......................... 235/380 |
| 4,494,211 | 1/1985 | Schwartz .......................... 375/107 |

(List continued on next page.)

FOREIGN PATENT DOCUMENTS 0010496 4/1980 European Pat. Off. .
0140013 5/1985 European Pat. Off. .

OTHER PUBLICATIONS

V. McLellan, "The Future of Data Security Looks Credit-Card Thin", *Information Week*, (10/07/85, pp. 24–30).
"Voice ID Knows Who, What, and Where", *Electronic Design*, (10/02/86, p. 12).
*Voice Key: Voice Verification Systems for Access Control*, (Ecco Industries Inc., Danvers, Mass., 1986).
*IBM Tech. Discl. Bull.*, (vol. 26, No. 7A, 12/83, pp. 3292–3293).

Primary Examiner—Stephen C. Buczinski
Assistant Examiner—Bernarr Earl Gregory
Attorney, Agent, or Firm—M. Lawrence Oliverio

[57] ABSTRACT

A personal verification system comprising a user device which is adapted to generate a time varying, multi-character, nonpredictable code; a verification device; a mechanism for permitting the user to communicate the nonpredictable code generated by the user device at a given time to the verification device in a manner such that a biocharacteristic of the user is communicated with each code character; the verification device including a mechanism for generating the same nonpredictable code as is appearing at the user device at the given time, a mechanism for converting each character of the generated nonpredictable code to an indication of the character which includes the biocharacteristic; and, a mechanism for comparing the communicated characters including biocharacteristics with the character indications including biocharacteristic, and a mechanism for indicating verification if the compared characters, including the biocharacteristic, match in a predetermined way.

11 Claims, 6 Drawing Sheets

U.S. PATENT DOCUMENTS

| | | | |
|---|---|---|---|
| 4,536,647 | 8/1985 | Atalla et al. | 380/24 |
| 4,543,657 | 9/1985 | Wilkinson | 375/1 |
| 4,575,621 | 3/1986 | Dreifus | 380/23 X |
| 4,578,530 | 3/1986 | Zeidler | 380/24 |
| 4,582,434 | 4/1986 | Plangger et al. | 368/46 |
| 4,582,985 | 4/1986 | Löfberg | 235/380 |
| 4,589,066 | 5/1986 | Lam et al. | 364/200 |
| 4,599,489 | 7/1986 | Cargile | 380/4 |
| 4,609,777 | 9/1986 | Cargile | 380/4 |
| 4,636,583 | 1/1987 | Bidell et al. | 380/48 |
| 4,641,322 | 2/1987 | Hasegawa | 375/1 |
| 4,677,552 | 6/1987 | Sibley, Jr. | 364/900 X |
| 4,677,617 | 6/1987 | O'Connor et al. | 370/100 |
| 4,685,055 | 8/1987 | Thomas | 364/200 |
| 4,742,537 | 5/1988 | Jesurum | 379/351 |
| 4,825,050 | 4/1989 | Griffith et al. | 235/379 |

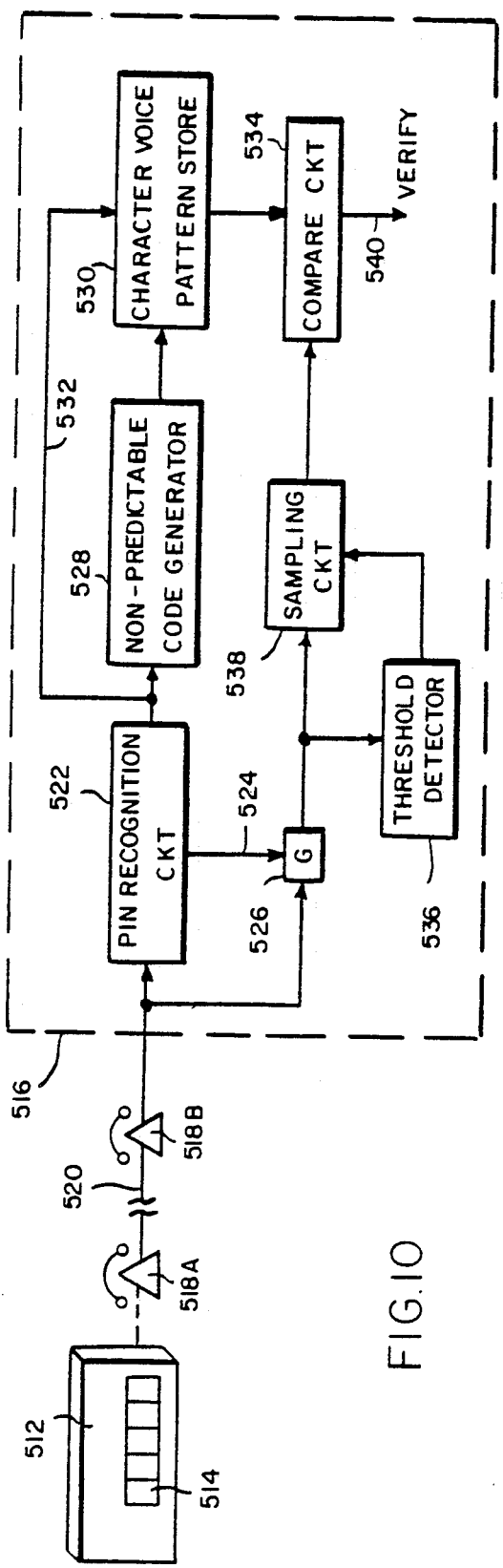
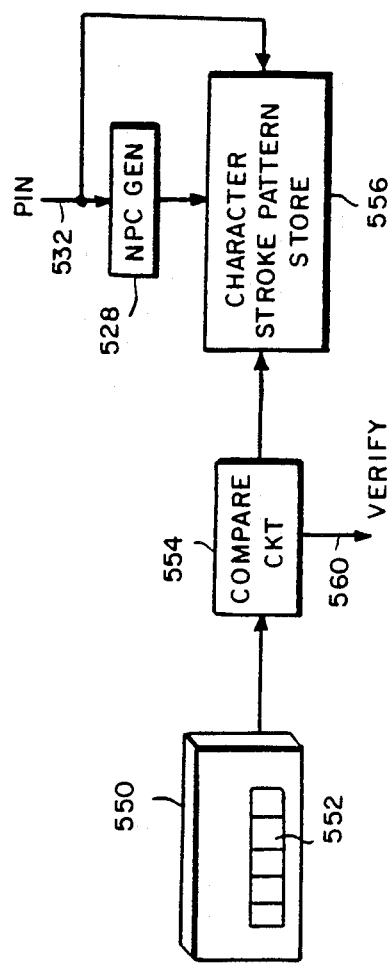
FIG. 10
FIG. 11

METHOD AND APPARATUS FOR PERSONAL VERIFICATION UTILIZING NONPREDICTABLE CODES AND BIOCHARACTERISTICS

CROSS-REFERENCE TO OTHER APPLICATIONS

This application is a continuation in-part of application Ser. No. 802,579 filed Nov. 27, 1985, now U.S. Pat. No. 4,885,778, which application is itself a continuation in-part of application Ser. No. 676,626 filed Nov. 30, 1984, now U.S. Pat. No. 4,720,860 issued Jan. 19, 1988.

FIELD OF THE INVENTION

This invention relates to methods and apparatus for verifying the identity of an individual and, more particularly, to methods and apparatus for utilizing both nonpredictable codes and a biocharacteristic of the individual whose identity is to be verified to provide enhanced verification security.

BACKGROUND OF THE INVENTION

Personal identification systems may be based on something someone has, such as a card or badge, something that someone knows, such as a personal identification number (PIN), or a biocharacteristic of the individual such as voice pattern or the like. Each of these bases alone can be defeated and thus does not provide a high level of personal verification security. For example, a card alone can be lost or stolen, a PIN can be overheard, can be surreptitiously intercepted and learned when being transmitted over a communication line, or can otherwise be compromised. Most biocharacteristics can be sampled surreptitiously and then computer synthesized or otherwise reproduced.

Heretofore, efforts have been made to enhance the security of personal verification systems by utilizing two of the bases in a single system. While this does result in enhanced security, the security is still not as high as would be desired for some applications. Ideally, all three bases would be used in a single verification system. However, the storage requirements for voice recognition or other biocharacteristic recognition systems are prohibitively high or a large number of inputs must be recognized if the system is adapted to recognize a reasonable number of individuals. If the system only needs to recognize the individual s saying a predetermined code sequence such as his PIN, the message is subject to surreptitious interception and simulation. Thus, even very expensive systems enjoy only limited success in providing a high level of verification security.

A need therefore exists for a relatively simple, inexpensive method and apparatus to provide highly secure personal identification, achieving this objective by utilizing all three bases in a synergistic way in performing the verification function.

SUMMARY OF THE SYNERGISTIC INVENTION

In accordance with the above, this invention provides a method and apparatus for verifying the identity of an individual wherein a user device is provided which generates a time varying, multi-character, nonpredictable code. The individual communicates the nonpredictable code generated at a given time to a verification device in a manner such that a biocharacteristic of the user is communicated with each code character. For example, the characters may be orally communicated over a voice channel such as a telephone line with a biocharacteristic being the voice pattern of the individual or the biocharacteristic may be the unique stroke pattern sequence which the individual uses in writing the characters, the characters appearing at the user device being communicated by being inputted through a stroke pattern recognition device such as a pressure-sensitive device. The verification device is adapted to generate the same nonpredictable code as is appearing at the user device at the given time, and for converting each character of the generated nonpredictable code to an indication of the character which includes the biocharacteristic. For example, an indication of the voice pattern of the individual for each character which may appear in the nonpredictable code may be stored and the voice pattern indication for the character read out in response to the character being generated. The communicated biocharacteristic indications from the individual are then compared with the indications obtained from the conversion, verification being signified if these indications match in a predetermined way.

The foregoing and other objects, features and advantages of the invention will be apparent from the following more particular description of preferred embodiments as illustrated in the accompanying drawings.

IN THE DRAWINGS

Figure 3A:
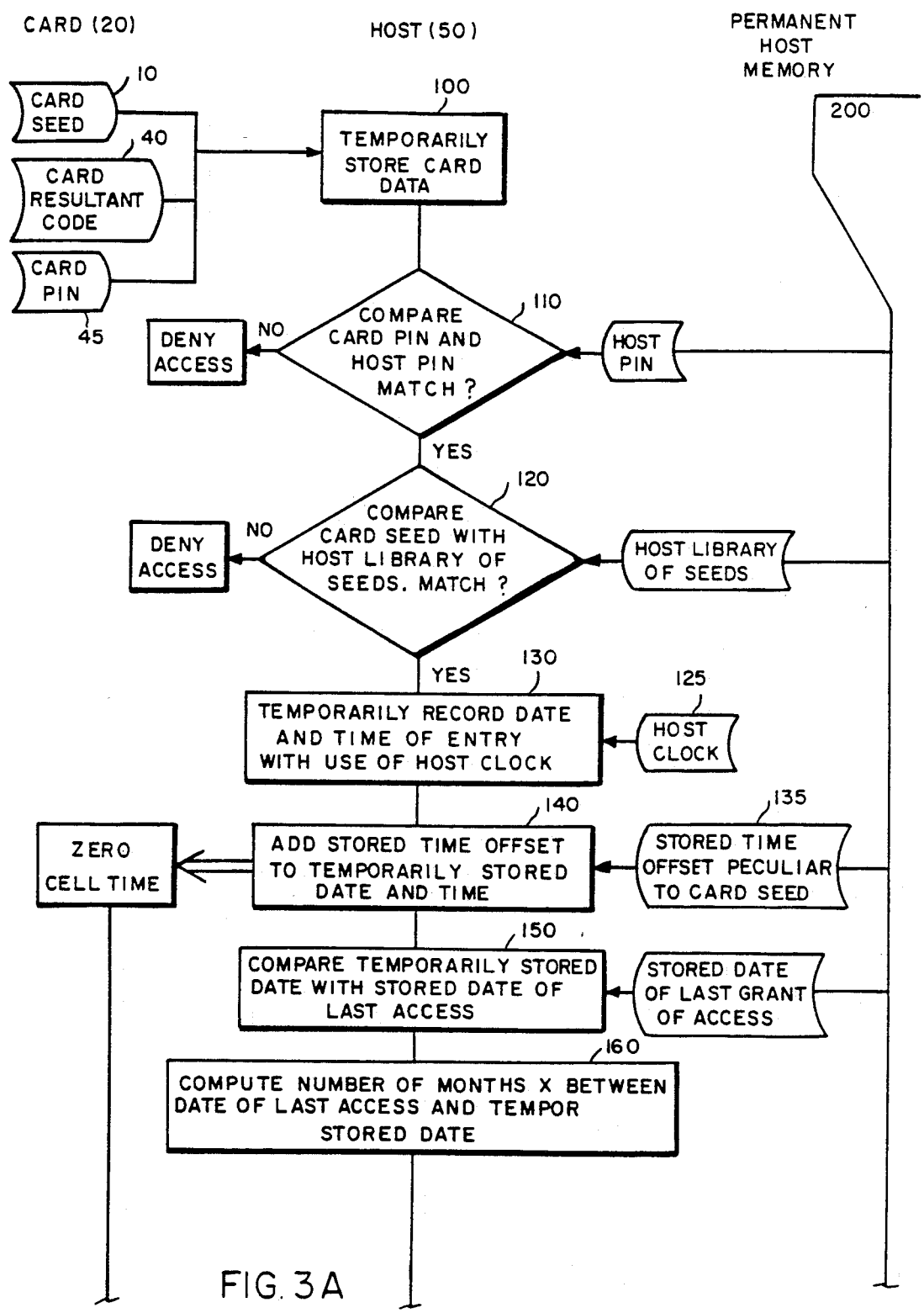
Figure 3B:
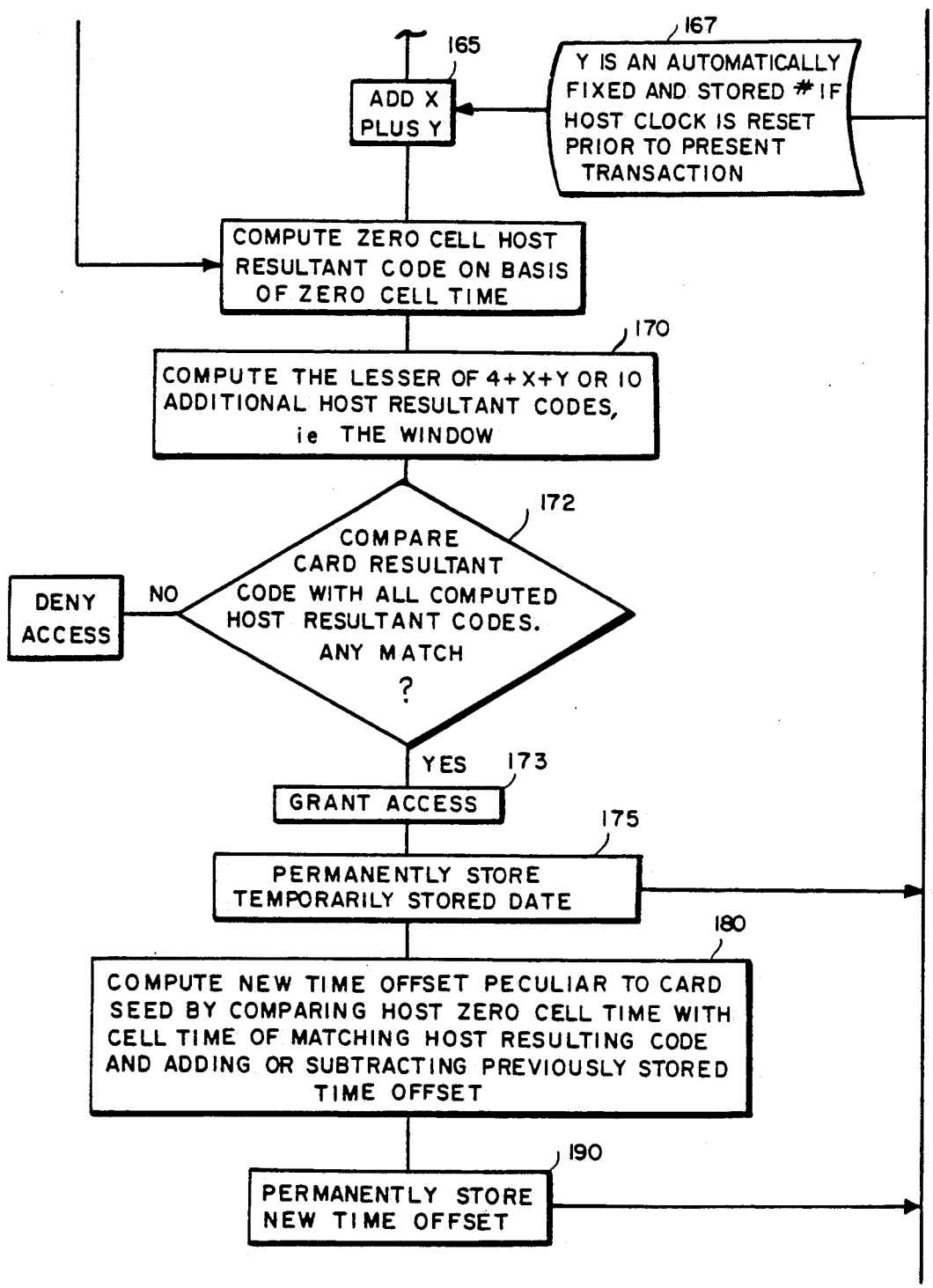

FIG. 3A-3B together form a flow chart demonstrating a most preferred series of steps carried out by an apparatus according to the invention and/or in a method according to the invention;

FIGS. 4-9 are diagrammatic representations of series of resultant code cells separately generated by separate computers according to exemplary situations described herein; each diagram sets forth the relationship vis a vis real time between resultant codes generated on the basis of time as kept by separate clock mechanisms in the separate computers generating the resultant codes according to the corresponding conditions described with reference to each figure;

FIG. 10 is a semi-block schematic diagram of a first preferred embodiment of the invention; and, FIG. 11 is a semi-block schematic diagram of a portion of the verification device for a second embodiment of the invention.

DETAILED DESCRIPTION OF THE SYNERGISTIC INVENTION

Referring to FIG. 10, the system includes a user device 512 which is preferably a credit-card sized device of the type described in detail in the parent application and patent previously mentioned. For purposes of ease of reference and completeness the specification of parent application Ser. No. 802,579 is set forth hereinbelow. Briefly, this device inputs a time varying value, for example, a clock value which varies every minute, and a fixed value, for example, a secret code word, into a processing device which operates on the two inputs in accordance with a secret algorithm to generate a multi character nonpredictable code which is preferably displayed on a multi character display element 514. Element 514 may, for example, be a standard liquid crystal or light-emitting diode display which is adapted to display the ten numeric characters 0-9. The display may also be adapted to display alphanumeric characters. While five character positions have been shown for the display 514 in FIG. 10, it is to be understood that this display may have any number of character positions depending on the degree of security required. Typically, this display might, for example, have eight characters.

The individual who is seeking to have his identity verified communicates information for accomplishing verification to a verification device or station 516 through standard telephones 518, telephone line 520 and modem 522.

In practice, the user will initially input his PIN or other identifying code on telephone 518A. While this may be done orally, it is preferably done by striking appropriate keys on the telephone to provide a digital indication. This input is applied to a PIN recognition circuit 522 in verification device 516. Circuit 522 may include a modem for converting the signals received over telephone line 520 into digital signals to operate device 516. When PIN recognition circuit 522 detects that a PIN is being received, it generates an output on line 524 which inhibits gate 526.

The PIN output from circuit 522 is applied as an addressing input to nonpredictable code generator 528 and to characterize voice pattern store 530. Nonpredictable code generator 528 operates in a manner described in detail in the beforementioned parent application and patent to generate a nonpredictable code at a given time which is the same as the nonpredictable code appearing on display 514 at that given point in time. This is accomplished by using the PIN input to access the secret code word stored in device 512 and an indication of the clock input at device 512, and to operate on such inputs utilizing the same algorithm as is used at the device 512. Parent application Ser. No. 802,579 set forth hereinbelow discloses various ways in which the clocks at the two devices 512 and 516 may be maintained in synchronism.

Character voice pattern store 530 stores a predetermined number of samples from the voice pattern of each individual using the system speaking each character which may appear on display 514. Thus, if only numeric characters 0-9 may appear on display 514, the voice patterns for each of these characters would be stored for each individual whose identity this system is to verify. In order to avoid storing huge amounts of information, a predetermined number of samples at selected intervals on the user voice pattern could be stored rather than the entire pattern The number of samples, the sampling interval, and the portion of the voice pattern sample will vary with the level of security required for the system and represent a trade-off between security level and the expense of added memory capacity. Another disadvantage of large number of samples is that it reduces the speed at which the system may operate. However, as will be discussed in greater detail later, since the system preferably uses three bases for verification, high levels of security can be achieved with a relatively small number of samples. Other voice verification systems well known in the art may be used in conjunction with the invention. As described more fully below, the system of U.S. Pat. No. 4,720,860 and application Ser. No. 802,579 for generating, verifying and synchronizing time variable nonpredictable codes provides a high level of security by itself. When such systems are combined with a biocharacteristic verification element, a very high level of security as contemplated by the invention is achieved, with or without the combination of the use of a PIN in the verification system.

The input over line 532 from PIN recognition circuit 522 addresses the area of memory 530 in which voice patterns are stored for the individual having the recognized PIN while the character inputs from code generator 528 address the individual character voice patterns for the individual. The voice patterns read out from memory 530 may be applied directly as one input to a compare circuit 534 or may be applied to temporary storage registers or other temporary storage means, the outputs from which are compared to compare circuit 534.

When a PIN is not being received over telephone lines 520, gate 526 is enabled to pass voice inputs. A received voice input is applied to threshold detector circuit 536 which generates an output to enable sampling circuit 538 when the received voice input exceeds a predetermined level. Threshold detector 536 assures that the sampling circuit will not operate in response to noise inputs and controls the point at which sampling begins so that the sampling of received inputs can correspond to the stored voice pattern samples. Circuitry for performing the threshold and sampling functions is well known in the art, and a number of existing circuits for performing this function may be utilized.

The output samples from circuit 538 are applied as the other input to compare circuit 534. Thus, voice pattern samples for each character of the nonpredictable code being orally inputted by the individual to be verified are compared in circuit 534 with stored voice pattern samples for the individual speaking the same characters. However, since the actual characters which appear on display 514 and the order in which the characters appear on display 514 is nonpredictable and varies with time as described hereinbelow, for example, every minute, someone surreptitiously intercepting the user voice pattern and attempting to reproduce it would still be unable to gain access to the system. A successful comparison in circuit 534 results in a verified output on line 540 which may be used to permit the user to gain access to a computer, to a data base, or for other desired purposes.

FIG. 11 illustrates an alternative embodiment wherein the biocharacteristic being utilized is stroke pattern sequence rather voice pattern. As is known, the stroking sequence which is used to write a character varies from individual to individual and is generally unique to a given individual. While two individuals may have similar stroke patterns for one or two characters, there is a very low probability of two individuals having the same stroke patterns for the five to eight characters of a typical nonpredictable code sequence.

Thus, in FIG. 11, a device 550 is provided which is responsive to character stroke patterns and generates a predetermined output in response thereto. Devices of this type are well known in the art and useable in connection with the invention. The device 550 may, for example, have a plurality of pressure-sensitive areas 552 in which the code appearing on display 514 may be written by the individual. Alternatively, there may be a single pressure-sensitive area 552 on which the individual writes the characters appearing on display 514 in sequence. In any event the user typically reads the nonpredictable code from display 514, converts the code into a hand stroke representation of the code with device 550 and sends the converted code by conventional means to compare circuit 554. Since it may take more than one minute to write an eight character sequence on pressure sensitive pads 552, the timing of device 512, and thus of device 528, could be altered so the code changes at two-minute intervals or three-minute intervals rather than at one-minute intervals.

While in FIG. 11, the device 550 has been shown as being at the verification station, this is for purposes of illustration only and it is possible to have this device at a remote location with its digital output being applied through a modem and telephone line to the verification device.

The output from device 550 is applied as one input to a compare circuit 554. As with the first embodiment of the invention, the PIN output from PIN recognition circuit 522 online 532 or some other pIN output is applied as one input to nonpredictable code generator 528 and is one of the addressing inputs to a character stroke pattern store 556. Store 556 is similar to character voice pattern store 530 in that it stores stroke patterns for each character from each individual who is to have access to the system. The input on line 532 controls the area in the device 556 which is accessed to the area for the individual having the given PIN and the output from NPC generator 528 causes the character stroke patterns from this area of memory to be read out in the appropriate sequence. As before, some storage may be required in order to synchronize the two inputs to compare circuit 554. If the stroke pattern inputs from device 550 and store 556 match within predetermined criteria, compare circuit 554 generates a verified output on line 560, which output performs the same function as the verified output on line 540.

Thus, a method and apparatus has been provided which synergistically utilizes something a person has, mainly the device 514 which generates the nonpredictable codes, something the individual knows, namely his PIN which permits the proper outputs from generator 528 and from the pattern stores 530 and 556, and something the individual is, namely a biocharacteristic of the individual which is inputted with the nonpredictable code to the verification device. As previously mentioned, the invention may simply utilize something a person has, mainly device 514 and something a person is, such as the voice or character stroke patterns described above. The system is thus very simple to use, since by merely inputting the nonpredictable code the user is also inputting his biocharacteristic. While some problems can be encountered, such as, for example, an individual using a different word for a particular character such as "zero" or "0" for the same digit. These problems can be handled by having redundant entries for certain characters, but are preferably handled by providing a few simple rules to each individual using the system so that inputs will be consistent.

In any event the system provides an incredibly high level of verification security. No matter how many messages may be surreptitiously intercepted, an unauthorized person not having the device 512 would still be unable to gain access to the system. Similarly, even if an individual had the device 512 and somehow learned the individual's PIN, they would still not be able to gain access to the system, since they would not possess his biocharacteristic.

While a particular type of voice pattern recognition system has been generally described in connection with the embodiment of the invention shown in FIG. 10, it should be understood that this system is being described for purposes of illustration only, and that any device or system adapted to perform the voice recognition function, of which there are many currently in existence, could be utilized to perform the function. Similarly, other devices could be used to perform the stroke pattern recognition. Further, while the two biocharacteristics selected for the preferred embodiments have optimum synergism with the other aspects of the system, there are other biocharacteristics which could be utilized while still falling within the teachings of this invention.

SUMMARY OF THE NONPREDICTABLE CODE GENERATION ASPECTS OF THE INVENTION

The following discussion sets forth the disclosure of application Ser. No. 802,579 and describes mechanisms and methods for generating nonpredictable codes per se without particular discussion of combining biocharacteristics therewith. As previously described the synergistic invention herein combines something a person has (the card 512), something a person knows (the PIN) and something a person is (the biocharacteristic). Insofar as the element concerning something a person has and something a person knows are concerned, the following described mechanisms and methods are contemplated for use as such elements to be used in conjunction with the biocharacteristic element. For purposes of ease of reference the card 512 described above corresponds to card or calculator 20.

In accordance with the invention, in a system for comparing and matching nonpredictable codes generated by separate computers on the basis of dynamic variables defined by separate clock mechanisms according to time, there is provided an apparatus for synchronizing the time definition of the dynamic variables comprising: a first computer for calculating a first nonpredictable code according to a predetermined algorithm, the algorithm generating the first nonpredictable code on the basis of a first dynamic variable and a unique static variable; a first clock mechanism for automatically defining the first dynamic variable according to a first interval of time in which the static variable is input into the algorithm, the first interval of time having a first predetermined duration; a second computer for calculating two or more second nonpredictable codes according to the predetermined algorithm, the algorithm generating the second nonpredictable codes on the basis of the two or more second dynamic variables and the unique static variable; a second clock mechanism for automatically defining the two or more second dynamic variables according to two or more cells of a second interval of time in which the static variable is input into the algorithm of the second computer, the second interval of time comprising a central cell of time having a predetermined duration and one or more cells of time bordering the central cell of time, each bordering cell of time having a predetermined duration; a mechanism for comparing the first nonpredictable code with the second nonpredictable codes to determine a match; and, a mechanism for automatically synchronizing the first clock mechanism and the second clock mechanism upon comparison and matching of the first nonpredictable code with one of the second nonpredictable codes.

The central cell of time typically comprises the date and the minute in which the unique static variable is input into the second computer as defined by the second clock mechanism; and the bordering cells of time may comprise a cell of time comprising the date and the minute immediately preceding the central cell.

Preferably the mechanism for synchronizing comprises: a counting mechanism for counting the difference in time between a central cell of time and a bordering cell of time from which a matching second nonpredictable code may be generated; a summing mechanism connected to the counting mechanism for summing successive differences in time counted by the counting mechanism; a storage mechanism connected to the summing mechanism; and, a shifting mechanism connected to the storage mechanism for shifting a central cell and bordering cells of time by the output of the summing mechanism stored in the storage mechanism.

The bordering cells of time may comprise a selected number of cells of time immediately preceding the central cell and a selected number of cells of time immediately following the central cell; and the central and bordering cells of time are typically selected to be one minute in duration.

Preferably, the mechanism for synchronizing further comprises: a second storage mechanism connected to the comparison mechanism for storing the date of the most recent comparison and matching by the comparison mechanism; a second counting mechanism connected to the second storage mechanism for counting the difference in time between the date stored and the date of present entry into the second computer; a dividing mechanism connected to the second counting mechanism for dividing the difference in time counted by the second counting mechanism by a selected value and prescribing the output as a first window opening number; a window opening mechanism connected to the dividing mechanism and the comparison mechanism for calculating as many extra second nonpredictable codes on the basis of as many extra bordering cells of time immediately preceding and following the selected number of bordering cells as prescribed by the first window opening number.

Most preferably, the mechanism for synchronizing further comprises: a sensing mechanism connected to the second clock mechanism for sensing a re setting of the second clock mechanism; a third storage mechanism connected to the sensing mechanism prescribing and storing the occurrence of a sensed re setting of the second clock mechanism as a selected second window opening number; and, a second window opening mechanism connected to the third storage mechanism for calculating as many additional second nonpredictable codes on the basis of as many additional bordering cells of time immediately preceding an following the extra bordering cells of time as prescribed by the second window opening number.

The first computer typically comprises a microprocessor wherein the algorithm is stored in volatile dynamic memory encapsulated with an energizing mechanism which when interrupted destroys all data including at least the algorithm and the static variable.

Most preferably, the algorithm of the second computer is stored in volatile dynamic memory encapsulated with an energizing mechanism which when interrupted destroys all data including at least the algorithm and the static variable.

In a method for comparing nonpredictable codes generated by separate computers on the basis of dynamic variables defined by separate clock mechanisms according to time wherein the codes match when the dynamic variables match, there is also provided a method for synchronizing the time definition of the dynamic variables comprising the steps of: inputting a static variable into a first computer including a predetermined algorithm; employing the algorithm of the first computer to calculate a first nonpredictable code on the basis of the static variable and a first dynamic variable defined by a first interval of time in which the step of inputting occurred according to a first clock mechanism; putting the static variable and first nonpredictable code into a second computer independently including the predetermined algorithm; using the algorithm of the second computer to independently calculate two or more second nonpredictable codes on the basis of the static variable and two or more second dynamic variables defined by two or more cells of a second interval of time in which the step of putting occurred according to a second clock mechanism, the second interval of time comprising a central cell of time and one or more bordering cells of time; comparing the first nonpredictable code with the second nonpredictable codes to determine a match; and, synchronizing the first clock mechanism and the second clock mechanism upon comparison and matching of the first nonpredictable code with one of the second nonpredictable codes.

The step of synchronizing preferably comprises the steps of: counting the difference in time between a central cell of time and a bordering cell of time from which a matching second nonpredictable code may be generated; summing successive differences in time counted during the step of counting; storing the summed successive differences in time; and, shifting the central and bordering cells of time by the summed successive differences in time.

Most preferably, the step of synchronizing further comprises the steps of: storing the date of the most recent comparison and determination of a match; counting the difference in time between the date stored and the date of present entry into the second computer; dividing the difference in dates counted by a selected value and prescribing the output as a first window opening number; and, calculating as many extra second nonpredictable codes on the basis of as many extra bordering cells of time immediately preceding and following the selected number of bordering cells as prescribed by the first window opening number.

Most preferably, the step of synchronizing further comprises the steps of: sensing a re-setting of the second clock mechanism; prescribing and storing the occurrence of a sensed re-setting of the second clock mechanism as a second selected window opening number; and, calculating as many additional second nonpredictable codes on the basis of as many additional bordering cells of time immediately preceding and following the extra bordering cells of time as prescribed by the second window opening number.

The volatile dynamic memory included in either or both of the first computer, the access control means, the host computer and the means for comparing preferably stores and maintains all programs such as the predetermined algorithm, system operating programs, code comparison and matching programs, and the like; and the volatile dynamic memory further preferably stores, maintains and makes available for use all data and results of operations such as fixed codes, resultant codes, dynamic variables and the like.

DETAILED DESCRIPTION OF THE NONPREDICTABLE CODE GENERATION ASPECTS OF THE INVENTION

In accordance with the invention an authorized person is provided with a fixed secret code or card seed 10, FIGS. 1, 1A, 2, 3, typically a number, which is unique to that individual. In the case of a credit or bank/cash card 20, FIG. 2, that number 10 may be printed on the card itself such that if the authorized owner of the card forgets the number, it can be quickly retrieved by reference to the card or other permanently printed form of the fixed code 10. Where the fixed code/card seed 10 is provided in permanent printed form on or in close connection with the apparatus of the invention there is also preferably provided an additional portion of the fixed code 10, a so called pin 45 (personal identification number), which the authorized user memorizes in order to further guard against misappropriation of the fixed code/card seed 10. The fixed code/card seed 10 or pin 45 may alternatively be used to identify an authorized terminal which has been issued by the authority presiding over the granting of clearance or access.

Figure 1:
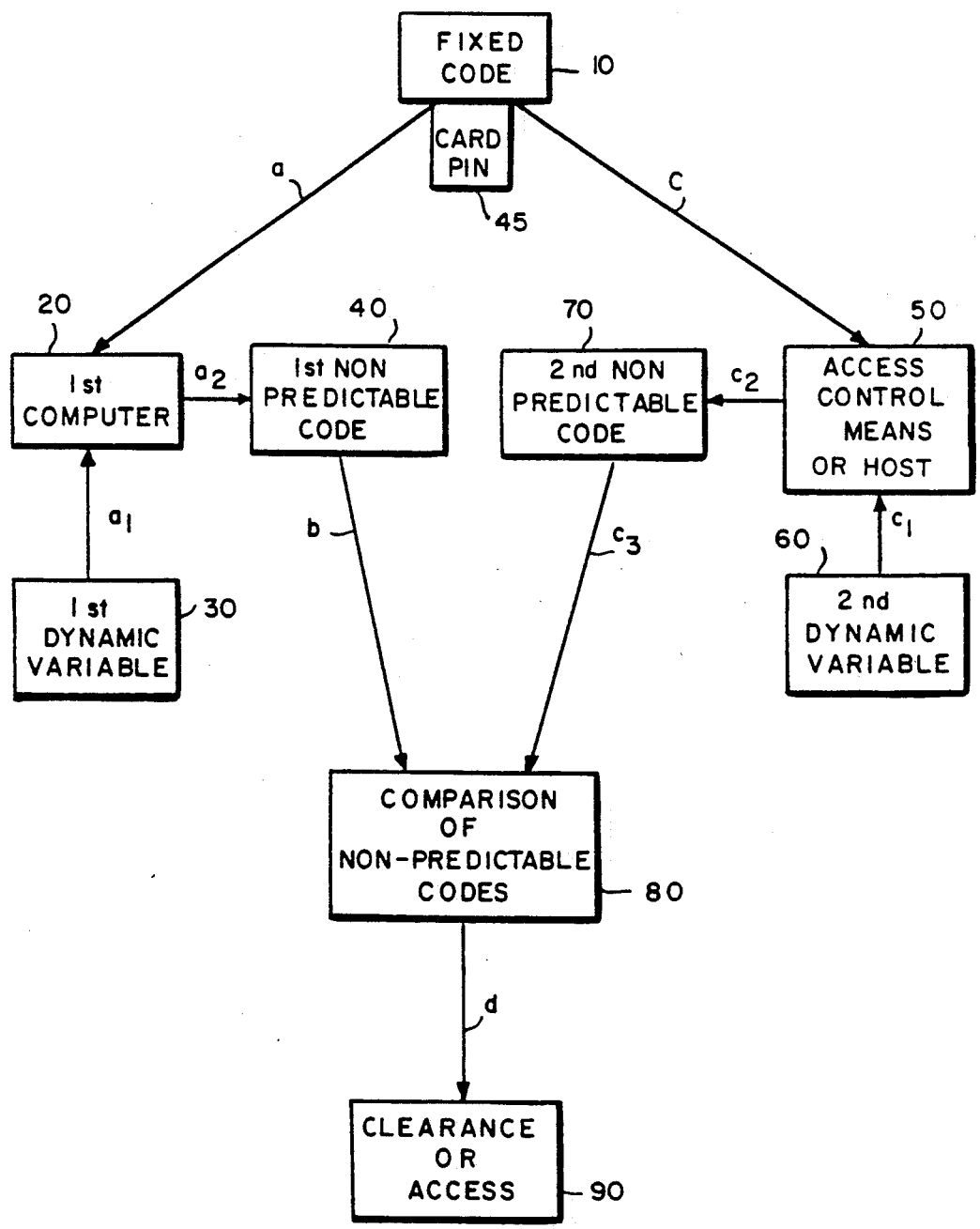
FIG. 1 is a block diagram of a basic apparatus and method according to the invention for generating and comparing nonpredictable codes.
Figure 1A:
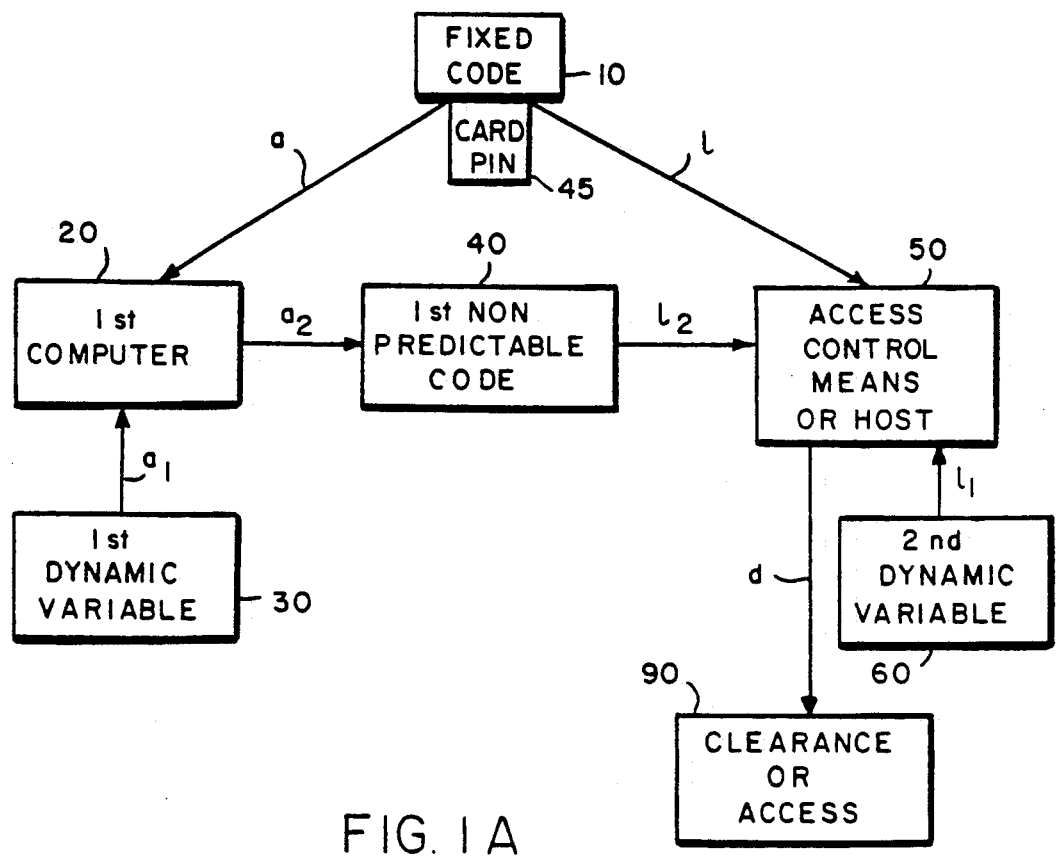
FIG. 1A is a block diagram of a preferred apparatus and method for generating and comparing nonpredictable codes where a means for comparing nonpredictable codes is included in a calculator which generates a nonpredictable code.

Such a fixed and/or memorized code (commonly referred to as a pin 45, FIG. 3, or personal identification number) is input into an access control module ("ACM") or host computer 50, FIGS. 1, 1A, 3, together with the unique static variable 10 and temporarily stored within the memory of the host or ACM, step 100, FIG. 3.

Preferably once the card seed 10 and pin 45 are input into the host or ACM 50, each is separately compared against a library of authorized card pins, step 110, FIG. 3, and a library of authorized card seeds, step 120, FIG. 3, stored in the host or ACM memory to determine whether there is a match. If either of the pin 45 or card seed 10 which the user inputs into the host or ACM does not produce a match, clearance or access is denied and the card user must start over in order to gain access or clearance.

Figure 2:
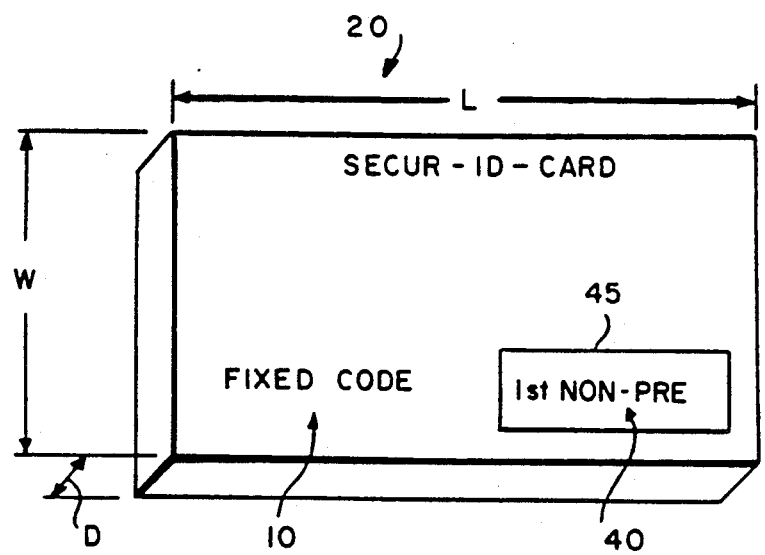
FIG. 2 is a front isometric view of a credit card sized calculator for calculating a first nonpredictable code for use in gaining clearance or access according to the invention.

In order to generate a nonpredictable code 40, FIGS. 1-3, which will ultimately give the user clearance or access, the fixed code or seed 10 and/or pin 45 must be input into a predetermined algorithm which manipulates the seed 10 and/or pin 45 as a static variable. The algorithm is typically provided to the user in the form of a calculator 20, FIG. 2, which is loaded with a program for carrying out the predetermined algorithm. The calculator 20 preferably comprises an electronic computer and most preferably comprises a microprocessor having a sufficient amount of volatile dynamic memory to store and carry out the functions of the predetermined algorithm. The computer 20 is most preferably provided in a card 20, FIG. 2, having the appearance and approximate size of a credit card.

Such credit card sized computer 20, FIG. 2, also preferably includes a conventional liquid crystal display 44 for displaying the ultimate nonpredictable code 40 generated by the algorithm (referred to in FIG. 3 as "card resultant code"). The nonpredictable code 40 thus generated may be visually observed by the user for eventual input into a host computer or ACM 50, FIGS. 1, 1A, 3. As shown in FIG. 2, the preferred form of card computer 20 has a length L of about 3.3 inches a width W of about 2.1 inches and a depth D of less than about 0.07 inches. In addition or as an alternative to providing microprocessor 20 with a liquid crystal display 45 for visual observation of the first nonpredictable code 40, computer 20 may include means for machine reading the first nonpredictable (or card resultant) code 40 and/or pin 45 to the ACM or host 50, or may include sound producing or other means for personally sensing the first nonpredictable code 40.

With reference to FIG. 3, after the card and host pins are compared and found to match, step 110, the card seed 10 is typically compared against a library of card seeds stored in the host or ACM memory in order to determine whether there is a match, step 120, FIG. 3. If the card seed 10 input into the host or ACM 50 does not match up with one of the seeds stored in the host library, access or clearance is denied, "no" step 120, FIG. 3.

For purposes of initial explanation the discussion which follows with reference to FIGS. 1 and 1A assumes an embodiment of the invention whereby a single resultant code 70 is generated by the host or ACM 50. The most preferred embodiment of the invention wherein the clock mechanisms which generate the resultant codes 40 and 70, are synchronized and wherein the host or ACM preferably generates a series of resultant, nonpredictable codes, as opposed to a single code 70 is described hereinafter with reference to FIGS. 4–9.

In addition to using the seed 10 and/or pin 45 as static variables the predetermined algorithm is designed to utilize a second variable, a dynamic variable 30, 60, FIGS. 1, 1A, to calculate the nonpredictable codes 40, 70 which may ultimately give access or clearance 90 to the user. A dynamic variable may comprise any code, typically a number, which is defined and determined by the interval of time in which the card seed 10 and/or pin 45 is put into the algorithm of either the card computer 20 or the host or ACM 50. A dynamic variable is most preferably defined by the date and the minute in which the static variable is input into the predetermined algorithm. A dynamic variable thus defined can be seen to change every minute. The dynamic variable could alternatively be defined according to any interval of time, e.g., 2 minutes, 5 minutes, 1 hour and the like. A dynamic variable thus defined would alternatively change every 1 minute, 2 minutes, 5 minutes, 1 hour or with the passage of any other predetermined interval of time.

With reference to FIG. 1 the most preferred means of establishing such a dynamic variable is via a time keeping means, such as an electronic digital clock, which by conventional means automatically inputs, steps $a_i$ or $c_i$, the date and specific interval of time (e.g., 1 minute, 2 minutes, 5 minutes, etc.) into the predetermined algorithm of the card 20 or host or ACM 50 in response to the input, step a or c, of the static variable 10 and/or pin 45. The date and time thus generated by the time keeping means may itself be independently manipulated according to another predetermined algorithm prior to input into the first predetermined algorithm of the dynamic variable 30 or 60 being input into the predetermined algorithm constantly changes in absolute value with passage of successive intervals of time of predetermined duration means that the card code 40 or host ACM code 70 generated according to the predetermined algorithm is also constantly changing with successive intervals of time and is thereby completely nonpredictable.

The nonpredictability of the codes 40, 70, FIG. 1, generated in the manner described above may be enhanced by the fact that the predetermined algorithm (together with the static variable 10 and/or pin 45 and dynamic variable 30 input thereinto) are preferably stored in the calculator 20 (and/or host or ACM 50) in volatile dynamic electronic memory which is encapsulated with an energizing means which destroys the algorithm, the card seed 10, and the dynamic variable 30 (or 60) when the electronic memory is invaded, interrupted or violated in any way. The predetermined algorithm thus stored in such volatile dynamic memory cannot be discovered by a would be thief because the entire memory including the predetermined algorithm is destroyed upon invasion of the memory.

In a preferred embodiment of the invention therefor the card seed 10 is stored in such volatile dynamic memory and by conventional means is automatically input step a, FIGS. 1, 1A into the algorithm of the first computer 20 at regular intervals of time. Such automatic inputting of the card seed 10 may thereby work in conjunction with the automatic definition and inputting of the first dynamic variable 30 into the predetermined algorithm of the first computer 20 to effect completely automatic generation of the first nonpredictable code or resultant code 40 at regular intervals of time.

The invention most preferably contemplates providing authorized personnel with a card computer 20, FIG. 2, only, but not with knowledge of the predetermined algorithm included in the computer 20. Authorized personnel are, therefore, provided with a computer 20 capable of carrying out an algorithm which is unknown to such authorized personnel.

In the most preferred embodiment of the invention where the predetermined algorithm provided to authorized users is stored in a volatile dynamic memory encapsulated with an energizing means which destroys the algorithm upon invasion of the memory, the only means of gaining unauthorized clearance or access is to misappropriate possession of the original computer 20 itself and knowledge of the fixed code/card seed 10 (and knowledge of the card pin 45 if employed in conjunction with the invention).

The algorithm may alternatively be designed to manipulate more than one fixed code and/or more than one dynamic variable. Several means for inputting each fixed code and dynamic variable may be included in the calculator 20 provided to users and in the host or ACM 50, FIG. 3. Each dynamic variable is preferably defined by the interval of time in which one or more of the fixed codes/card seeds are input into the algorithm.

It can be seen, therefore, that the predetermined algorithm can comprise any one of an infinite variety of algorithms. The only specific requirement for an algorithm to be suitable for use in the present invention is that such algorithms generate a nonpredictable code on the basis of two classes of variables, static variables (the fixed codes) and dynamic variables such as described hereinabove. A nonpredictable code C which is ultimately generated by the predetermined algorithm, f(x,y), may be expressed mathematically as:

$$f(x,y) = C$$

where x is a static variable/fixed code and y is a dynamic variable. Where several (n) static variables ($x_1$, $x_2$, ... $x_n$) and several (n) dynamic variables ($y_1$, $y_2$, ... $y_n$) are intended for use in generating nonpredictable codes, a nonpredictable code thus generated may be expressed mathematically as $f(x_1, x_2, ... x_n, y_1, y_2, ... y_n) = C$.

The specific form of the algorithm only assumes special importance as part of the invention, therefore, when the algorithm is capable of being discovered by would be unauthorized users. In the most preferred embodiment of the invention where the algorithm is completely undiscoverable by virtue of its storage in a volatile dynamic electronic memory which destroys the algorithm upon attempted invasion of the encapsulated memory, the specific form of the algorithm comprises only an incidental part of the invention. The mere fact of the use of some algorithm to manipulate the fixed code and the dynamic variable does, however, comprise a necessary part of the invention insofar as an algorithm generates the ultimately important nonpredictable code.

As the term "fixed code" or "card seed" or "seed" is used herein such terms include within their meaning numbers, codes, or the like which are themselves manipulated or changed, mathematically or otherwise, in some non dynamic manner prior to or during the generation of a second nonpredictable code 40, FIG. 3. The first 20 or second computer 50 may, for example, be provided with a static program/algorithm utilizing the fixed code or seed as a variable and generating a new fixed code or seed which is ultimately input as the fixed code or seed 10 variable in the secret algorithm which generates the nonpredictable codes. For example, for purposes of added security, a fixed code or seed 10 may be first added to another number and the result thereof used as the fixed code or seed 10 used to generate the nonpredictable codes. Thus, the term fixed code or seed includes within its meaning the result of any non-dynamic operation performed on any fixed code or seed. It can be seen, therefore, that essentially any algorithm or operation may be performed on the fixed code 10 to generate another fixed code or seed, the algorithm or operation most preferably comprising a static algorithm or operation, i.e., one not utilizing dynamic variables so as to generate a static result.

With reference to FIG. 1, after a first nonpredictable code 40 is generated as described above, such first nonpredictable code 40 is compared 80 with the "second" nonpredictable code 70 which is also generated by the user by putting, step c, the fixed code/card seed 10 (and the pin 45, if employed) into the host or ACM 50 which contains the same predetermined algorithm used to generate the first nonpredictable code 40.

With reference to FIG. IA, (a schematic diagram which assumes the host or ACM 50 includes the predetermined algorithm and the mechanism for comparing and matching the nonpredictable codes) the first nonpredictable code 40 is input, step $e_2$, into the host or ACM 50 essentially immediately after the fixed secret code 10 is put into the host or ACM 50 (i.e., step $e_2$ is carried out essentially immediately after step e) in order to gain clearance or access 90. If steps e and $e_2$ are not carried out within the same interval of time as steps a and $a_1$, were carried out, (i.e., the same interval of time on which code 40 is based), then the host or ACM will not generate a second dynamic variable 60 which will allow the predetermined algorithm of the host or ACM 50 to generate a second nonpredictable code which matches the first nonpredictable code 40.

Figure 4:
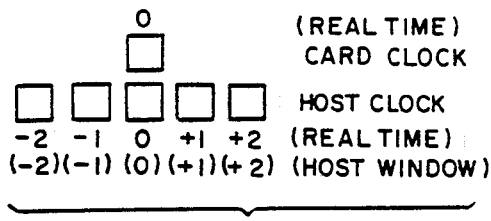

The necessity for carrying out steps e and $e_2$, FIG. 1A, within the same minute or other selected interval of time ("cell") is obviated in a most preferred embodiment of the invention. With reference to FIGS. 3-4, the card 20 generates a resultant code 40, on the basis of a cell of time in which the code 40 was generated as defined by the card clock. Assuming for the sake of explanation that the card clock and the host or ACM clock 125 are synchronized with each other and with real time and assuming the user inputs the correct card seed 10 and resultant code 40 into the host or ACM 50 within the same cell of time as the resultant code 40 was generated by the card 20 the host 50 is preferably provided with a program which generates a series or "window" of resultant codes (as opposed to a single non-predictable code 70, FIG. 1). [As used hereinafter, the term "cell" is, depending on the context, intended to refer to an interval of time of predetermined duration on which the generation of a resultant code is based or to the resultant code itself.] The various second nonpredictable codes which comprise the "window" are calculated by the host or ACM 50 on the basis of the cell of time in which the user correctly entered the seed 10, code 40, and pin 45 into the host or ACM 50 as defined by the host clock 125, FIG. 3, and one or more bordering cells of time, e.g., $-2$, $-1$, and $+1$, $+2$ as shown in FIG. 4. An ACM or host computer 50 program then compares the card resultant code 40 with all of the individual resultant codes computed as the window of host cells shown in FIG. 4 to determine whether there is a match between an of the host cells and the card code 40. In the example stated, the card code 40 will of course match up, step 172, FIG. 3, with the zero cell based host code, FIG. 4 because the user input the seed 10, pin 45 and code 40 within the same cell of time as the card code 40 was generated.

[As used hereinafter, "input" or "inputiing" or "entry" into the host or ACM 50 refers to input of the correct card seed 10, card resultant code 40 and card pin 45 into the host or ACM 50 and positive matching of the card seed 10, step 120, FIG. 3, and card pin 45, step 110, with a host seed and host pin which are stored in the permanent memory in the host or ACM 50].

Figure 5:
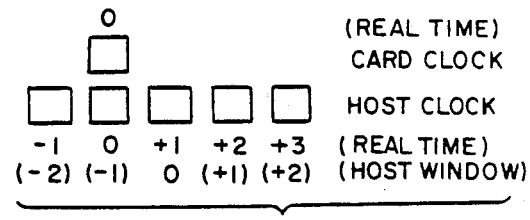

Assuming in the example stated above with reference to FIG. 4, however, that the user had input the card code 40 and seed 10 (and pin 45), FIG. 3, one minute later than the card had generated the code 40, the host or ACM 50 will have generated a different window of codes as shown in FIG. 5; that is, the host will have generated a central cell corresponding to a $+1$ cell code (based on real time) as if the $+1$ cell is the zero cell of the window of cell (as shown in parenthesis in FIG. 5) and further generate the predetermined number of bordering cell codes (e.g., real time $-1$, 0 and $+2$, $+3$ as shown in FIG. 5). Thus, although the user inputs the card seed 10 and the card resultant code 40 into the host or ACM 50 one minute late, the host computer 50 still generates a matching cell code, the real time zero code which "borders" the central cell, i.e., the $+1$ central cell code as shown in parenthesis in FIG. 5.

Provision of the host or ACM 50, FIGS. 3-5 with a mechanism for generating a series or window of second nonpredictable codes, as opposed to a single second code 70, FIG. 1, thereby allows a card user a selected amount of leeway of time (beyond the time length of the interval of time on which code 40 is based) in which to input a correct seed 10, pin 45 and card code 40 into the host or ACM 50 and still generate a matching host resultant code.

The examples stated above assumed that the card clock and the host clock 125, FIG. 3, were both synchronized with real time. Assuming the card clock and the host clock remain synchronized at all times, it would only be necessary to provide the host or ACM 50 with a mechanism for generating a selected number of bordering cells which "precede" the central cell of the window, e.g., with reference to FIG. 5, the $(-2)$, $(-1)$, (0) cells. In those applications where the card clock and the host clock are maintained in synchrony with each other at all times, the host or ACM clock 125 preferably defines only two dynamic time variables so as to generate a central cell code and a $-1$ host window cell code. Such embodiment allows the user to input to seed 10, pin 45 and code 40 one cell code late but only one cell code late for security enhancement.

In the more typical case, however, where the card clock and the host clock 125 may be out of synchrony with real time, e.g., where the card clock is running fast relative to the host clock, the generation of cells which "follow" the central cell of the host window may be required to generate a matching host resultant code.

Figure 6:
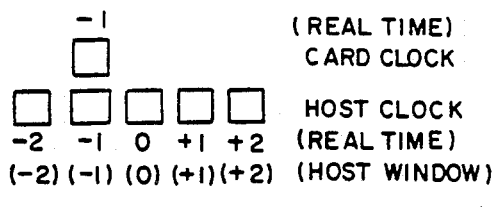

With reference to FIGS. 3, 6, the invention most preferably provides a mechanism for synchronizing the card and host clocks in the case where such independent clocks more typically run fast or slow relative to real time and/or relative to each other.

The following examples assume for purposes of explanation that the time equivalent length of all cell codes are one minute in duration. Assuming that the card clock is one minute slow and the host clock 125, FIG. 3, is correct relative to real time, the card will generate a resultant code 40 based on a real time of $-1$ minute (relative to the host clock 125) and, if the user inputs the card resultant code 40 (and the correct seed 10 and pin 45) into the host or ACM 50 within the same minute as the code 40 is generated, the host or ACM 50 will generate a window of resultant codes according to the series of cells shown in FIG. 6 (assuming the predetermined number of bordering cells is selected as 2 cells immediately preceding and 2 cells immediately following). Matching resultant codes, i.e., the card $-1$ cell code and the host $-1$ cell code, will thus have been generated.

Although the card clock was one minute slow in the example just described, the host computer is provided with a program mechanism which will automatically adjust (i.e., synchronize) the host clock time with the card clock time when the card user next enters a correct card seed 10 and card pin 45 (and code 40) into the host or ACM 50. The host accomplishes such synchronization by storing a difference in matching cell time in the permanent memory of the host, step 190, FIG. 3; e.g., in the example just described, the last matching transaction, step 180, FIG. 3, fell in the $-1$ cell of the host "window" as shown in parenthesis in FIG. 6. Such cell time difference is referred to herein as the "time offset" which is stored in the permanent host memory, step 190, FIG. 3. The time offset is the difference in time between the central cell and the bordering cell from which a matching second nonpredictable code was generated.

Figure 7:
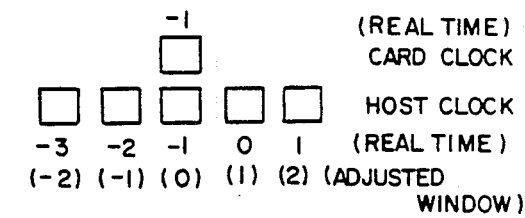

Upon the next entry of the card user into the host 50 (assuming the card clock has not run any slower since the last entry and assuming the host clock has remained synchronized with real time and assuming the user next enters the host 50 within the same minute as the card generates resultant code 40), the host computer 50 will automatically algebraically add the stored time offset, steps 135, 140, FIG. 3, to the temporarily stored host clock time, step 130, and generate the series of relative real time host cell codes shown in FIG. 7 wherein the card code cell which is one minute slow in real time, is now treated in the host window as a zero cell (as shown in parenthesis in FIG. 7), i.e., the central cell of the host window of cells, is adjusted to subtract one minute therefrom, via subtraction of the one minute stored time offset 135, FIG. 3. As shown in FIG. 7, the bordering cells of the host window are similarly adjusted by the one-minute stored time offset. Further, in all future entries by the user into the host 50, the temporarily stored time and date of entry, step 130, FIG. 3, will be adjusted by the permanently recorded one-minute stored time offset.

As to the example described above with reference to FIG. 5 wherein the card and host clocks were assumed to be synchronized with real time and wherein the user entered the host one minute late, it is noted that even though the host clock was synchronized with real time, the host will nevertheless compute a time offset, step 180, FIG. 3, to be stored, step 190, and used in adjusting the temporarily stored time of entry, step 130, FIG. 3, in future transactions by the user, because the matching cell of the host window, as shown in parenthesis in FIG. 5, was not the central cell code of the window (i.e., was not the real time +1 cell code) but rather was a bordering real time cell code, i.e., the bordering real time zero cell code.

Simply stated, therefore, a stored time offset will be computed step 180, FIG. 3, and stored, step 190, FIG. 3, for use in adjusting the time of entry into the host in all future entries, step 140, FIG. 3, whenever on a given entry, step 130, FIG. 3, a "bordering" cell code of the host window (as opposed to the central cell code) produces a match with the input card resultant code 40.

In storing, step 190, FIG. 3, a time offset which is computed, step 180, during any given transaction, the presently computed time offset is algebraically added or summed to any time offsets previously computed and stored as a result of previous entries and granting of access, step 173.

Inasmuch as a clock mechanism, once beginning to run fast or slow, will continue to run fast or slow during all future uses of the system of the invention, the host or ACM 50 will add or subtract all time offsets recorded during successive uses of the system to the stored time offset(s) recorded and permanently stored from previous transactions, step 180, FIG. 3. Most preferably, a newly computed time offset will not be permanently stored, step 190, in the host or ACM memory 200, unless and until access or clearance has already been granted, step 173.

As described and shown in the examples of FIGS. 4–7, the host or ACM is typically programmed to compute four (4) cell codes bordering the central cell code (i.e., two cells immediately preceding and two cells immediately following the central cell) as the "window" within which the user is allowed to deviate in inputting the card seed 10, the pin 45, and, the card resultant code 40 into the host or ACM. Such bordering cells have been described as corresponding to codes corresponding to one-minute intervals. It is noted that the number and time equivalent length of the bordering cells may be increased or decreased as desired.

Figure 8:
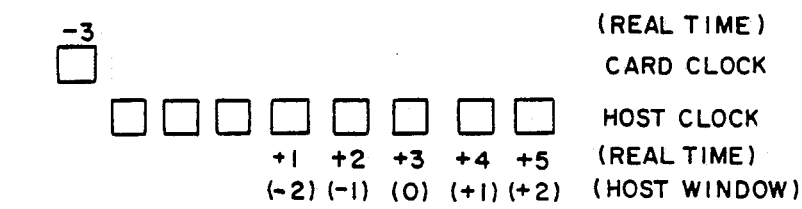

The absolute degree by which the card clock and the host or ACM clock 125 may run fast or slow relative to real time typically increases with the passage of time. For example, if the card clock is running slow by 30 seconds per month and the host clock is running fast at 30 seconds per month, the two clocks will run the time equivalent of one minute out of synchrony after one month, two minutes out of synchrony after two months, three minutes out of synchrony after three months, etc. If the authorized card user uses the card each month, the automatic synchronizing means described above with reference to FIGS. 4–7 will have adjusted the host or ACM time window upon each usage to account for such lack of synchrony with real time. If, however, the card user does not actually use the card for, for example, six months, the card clock and the host clock will be six minutes out of synchrony, and even if the user correctly uses the system by inputting the pin 45, card seed 10 and card code 40, FIG. 3, into the host or ACM within the same minute (or other selected time cell interval) as the pin 45, the seed 10 and code 40 were generated by the card, the user would not be able to gain access or clearance (i.e., cause the host or ACM to generate a matching resultant code) in the typical situation where the "window" of bordering cell times is selected as two one minute cells immediately preceding and two one minute cells immediately following the central host cell. FIG. 8 depicts such an exemplary situation as just described, wherein it can be seen that the card clock, after six months of non-usage, generates a resultant code 40, FIG. 3, which is based on 3 minutes in real time, and the host clock, after six months of non-usage, causes the generation of the typically selected five cell window comprising cell codes corresponding to +1, +2, +3, +4, and +5 minutes in relative real time. In the typical case, therefore, where the selected window comprises four bordering cells, matching second nonpredictable codes will not be generated under any circumstances after six months of non-use.

The invention most preferably provides a mechanism by which the host window of bordering cells is opened wider than the preselected window by an amount which varies with the length of time of non use of the card. Such window opening is accomplished by storing the most recent date of comparison and matching, determining the difference in time between such date and the present date of entry into the second computer and calculating as many additional bordering cells as may be predetermined according to the difference in time between the dates.

Typically the window is opened by two one minute bordering cells per month of non use (e.g., one cell immediately preceding and one cell immediately following the preselected window) but the number of cells by which the window is opened and the time equivalent length of each cell may be predetermined to comprise any other desired number and length.

Figure 9:
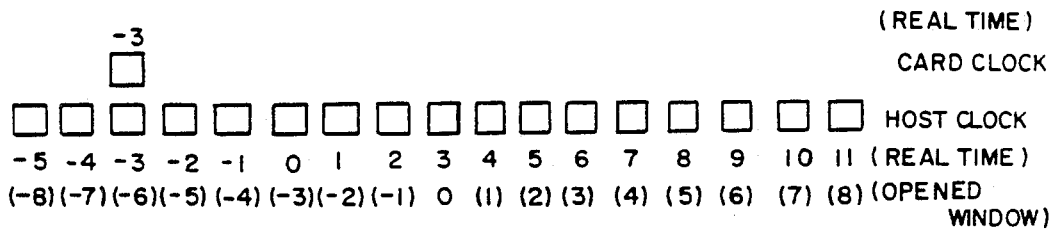

Assuming the exemplary situation described above where the card clock and the host clock 125, FIG. 3, are running slow and fast respectively by 30 seconds per month, the host or ACM compares, step 150, the temporarily stored date of the present entry, step 130, with the permanently stored date of the last access, step 175, and computes the number of months X, step 160, between the date of last access and the date of present entry. In the present example six months of non-use is calculated step 160, FIG. 3, and the window is opened by six additional one minute bordering cells on either side of the preselected four cell window as shown in FIG. 9 to give an overall window of sixteen minutes. The card resultant code 40 based on −3 minutes in relative real time thus matches, step 172, FIG. 3A, as shown in FIG. 9 with the −6 host bordering cell code (−3 in real time)

and access or clearance is ultimately granted. As described above with reference to FIGS. 4-7, because the matching host cell code is a bordering cell code of the host window and not the central host cell (i.e., the zero cell), a new stored time offset of −6 minutes will be computed (i.e., added to the permanently stored time offset), step 180, FIG. 3, and stored, step 190, and the host clock thereafter will adjust the zero cell of the host window (and accompanying bordering cells) each time the user of the card having the particular card seed 10 and pin 45 which was used in the present transaction uses the card to gain access in future transactions.

Lastly the invention further includes a fail safe window opening mechanism to provide for the contingency where the host or ACM 50 and its clock 125, FIG. 3, may shut down between card usages. In the event of such a shut-down, the host or ACM clock 125 must typically be reset and re-synchronized, and in the course of such re setting an error may be made in the resynchronization. In order to insure that the card user may reasonably gain access in the event of such an error in re-setting the host clock 125, the host or ACM 50 is preferably provided with a mechanism for sensing such a re-setting and for storing a predetermined window opening number upon each re-setting of the host or ACM 125. Such window opening number is typically selected as six additional one-minute bordering cells (e.g., three additional cells immediately preceding and three additional cells immediately following the existing window) but may be selected as more or fewer cells of other selected length.

The re-setting window opening number is typically added, step 165, FIG. 3, to the result of non-usage step 160 and the total additional number of cells comprising the window is computed, step 170, FIG. 3, all bordering cells surrounding the central cell are computed including (a) the preselected window allowing for user delay in inputting and/or card and host clock asynchrony, (b) the non-usage window allowing for card and host clock asynchrony over long periods of time of non-usage and (c) the re-setting window opening number.

Assuming the exemplary situation described above with reference to FIG. 9, if the host or ACM had shut down within the six month period of non-use, the host window as depicted in FIG. 9 would be further opened by an additional six bordering cells such that −11, −10, −9 and +9, +10, +11 host window cells would also have been computed, step 170, FIG. 3, and made available for comparison and potential matching with card resultant code 40 in step 172, FIG. 3. As described above with reference to FIGS. 5-9, where a new time offset is computed and stored, steps 180, 190, FIG. 3, as a result of a match found in a bordering cell of a window generated by virtue of non usage and/or the preselected window, a new time offset will similarly be computed and stored, steps 180, 190, if a match is found in a bordering cell generated as a result of shut-down.

Unlike the non-usage window opening number, the re-set window opening number is typically stored in the permanent memory 200 of the host or ACM 50, FIG. 3, such that once the host clock 125 is re-set, the selected window opening number is available in permanent memory 200 to open the window upon thO next attempted entry by the user. Although the re-set window opening number is established and stored in permanent memory 200, such re-set window opening number is preferably eventually closed down or eliminated for security enhancement after it is established upon successive attempted entries by a variety of card users that the host clock 125 was correctly reset or after the host clock 125 is otherwise resynchronized with real time to correct any errors which may have occurred as a result of the re-setting. The use of the re-set window opening number is, therefore, preferably temporary.

In the practical application of the invention, many cards are issued to many users and each card includes its own card clock. Recognizing that the average of the times being kept by the individual clocks of a statistically significant sample of a variety of cards, will produce an accurate or very nearly accurate representation of real time, the invention most preferably includes a mechanism for permanently adjusting the time kept by the host clock 125, FIG. 3, after the clock 125 has been re-set, to the average of the times of entry (after re-setting of the host clock 125) of a selected number of different cards or card users. For example, assuming that host clock 125 has been reset, the next time of entry of the next five (or other selected number of) separate card user is averaged, the host clock 125 is permanently adjusted or resynchronized to such an averaged time, and the re-set window opening number is thereafter eliminated from the permanent host memory 200. Re-adjusting or re-synchronization of the host clock 125 to the averaged time of the card clocks is typically carried out by the host 50 by computing another master time offset which is algebraically added to the time offsets peculiar to each card 20. The computation of such a master offset assumes that a selected number of separate cards 20 were able to gain access, step 173, FIG. 3, as a result of the re-set window opening or otherwise. The average of the time offsets computed as to the selected number of cards which enter the host 50 (after the host clock 125 is re-set) is preferably stored as a master time offset (i.e., as a re-synchronization of the host clock 125), the re-set window opening number is then eliminated as to all future entries by card users, and the master time offset is used (in addition to permanently stored time offsets peculiar to each card) to adjust the card clock 125 in transactions as to all card entries thereafter.

As a practical matter, a limit is typically placed on the total number of bordering cells by which the window is opened regardless of the length of time of non-usage by the card user or the number cf times the host or ACM 50 is reset as a result of re-setting of clock 125. For security reasons, such a limit is typically selected as ten one minute bordering cells—as stated in step 170, FIG. 3, the number of codes comprising the window are the lesser of (a) 4 bordering cell code, the preferred selected window, plus X, the number of months or other selected non-usage periods, plus Y, the shut down window opening number, or (b) 10, the maximum number of additional cell codes. Such a maximum window may, of course, be selected as more or less than 10 depending on the degree of security desired It is noted that FIG. 3 depicts a preferred sequence of operations and not necessarily the only sequence. Steps 110 and 120 could, for example, be interchanged or, for example, the step of automatically inputting the re-set window opening number, step 167 could precede any of steps 140-160.

The host or ACM 50, FIGS. 1, 1A, 3, typically includes one or more programs and sufficient memory to carry out all of the steps shown in FIG. 3, although one or more of those functions may be carried out by a device separate from and communicating with or connected to the host or ACM 50.

With respect to the computation, storage and retrieval of time offsets, the host or ACM 50 is provided with mechanisms for recognizing, storing, retrieving and computing time offsets which are peculiar to each card seed 10 and/or pin 45 and responsive to &he input of the same into the host or ACM 50.

FIG. 2 depicts the most preferred form of the calculator 20 which is provided to authorized users for generating the first nonpredictable or card resultant code 40. As shown in FIG. 2 the calculator 20 is of substantially the same size as a conventional credit card and includes a conventional liquid crystal display 44 for displaying the code 40 to the user. The credit/card computer 20, FIG. 2, may bear the identity of the card seed/fixed code 10 printed on its face, and includes a digital clock means, an energizing means, a microprocessor and sufficient memory for storing the predetermined secret algorithm, a program for generating a dynamic variable if desired, and the card seed 10 and pin 45 if desired.

In an embodiment of the invention where the goal is to grant access to a physical facility, the ACM 50 may comprise a portable device such that it may be carried by a security guard stationed at a central access location leading to a guarded building or other facility. A security guard thus in possession of such an ACM would typically read the card seed 10 and the nonpredictable code 40 appearing on the card 20, FIG. 2, of authorized person and input such codes 10, 40 (in addition to the pin 45—otherwise provided to the guard by the card bearer) into the portable ACM 50 to determine whether the card bearer is truly in possession of a card 20 which was issued by the authority establishing the secret predetermined algorithm.

As described herein protection of the secrecy of the predetermined algorithm is preferably accomplished in the calculators provided to authorized personnel by virtue of its storage in volatile dynamic memory and encapsulation with a volatile dynamic energizing means. With respect to the algorithm provided in the ACM secrecy may be maintained in a similar manner or other conventional manner, e.g., by physically guarding the ACM or requiring additional access/user codes to gain direct access. Where all programs, data and results of operation are stored in such volatile dynamic memory, the same are similarly protected against invasion.

Although the invention contemplates some form of communication cf the result of operation 40 carried out on the card 20, FIG. 2, to the host or ACM 50 or any other electronic device, a talking between the computer 20 and the host 50 is not required or contemplated by the invention. Therefore, after the first computer 20 has calculated the first nonpredictable code 40 and the code 40 has been input into the host 50, no other information need be communicated back to the first computer 20 from the host 50 or another device in order to gain clearance or access.

Lastly it is noted that the fixed code or seed 10 and/or pin 45, FIG. 3, may be employed to identify a computer terminal or other piece of equipment or device as opposed to a card 20. For example, a terminal or a space satellite or other device may be provided with a computer 20 which is assigned a code or seed 10 and/or a pin 45 (and, of course, provided with the secret predetermined algorithm and a clock and conventional electronic mechanisms for computing the code 40 and inputting the code 10, pin 45, and resultant code 40 to the host or ACM 50) in order to identify such terminal, satellite or the like in the same manner as a Card computer 20 is identifiable as described hereinabove.

Thus, while the invention has been particularly shown and described above with reference to preferred embodiments, the foregoing and other changes in form and detail may be made therein by one skilled in the art while still practicing the teachings of this invention.

What is claimed is:

1. A user verification system comprising:
    a user device which is adapted to generate a time varying, multi-character, nonpredictable code;
    a verification device; and
    means for permitting the user to communicate the nonpredictable code generated by the user device at a given time to the verification device in a manner such that an indication of a biocharacteristic of the user is communicated with each code character;
    the verification device including means for generating the same nonpredictable code as is appearing at the user device at the given time, and means for converting each character of the generated nonpredictable code to an indication of the character which includes an indication of the biocharacteristic;
    means for comparing the communicated characters, including the indications of biocharacteristics, with the converted character indications including biocharacteristic indications, and means for indication verification if the compared characters, including biocharacteristic indications, match in a predetermined way.

2. A system as claimed in claim 1 wherein said means for permitting the user to communicate is a voice channel, and wherein the biocharacteristic indicated is a voice pattern.

3. A system as claimed in claim 2 wherein said voice channel is a standard telephone line.

4. A system as claimed in claim 2 wherein said verification device includes means for storing an indication of the voice pattern of the user for each character which may form part of the nonpredictable code, and wherein said means for converting includes means responsive to each generated character for reading out the corresponding voice patter indication for the user.

5. A system as claimed in claim 1 wherein said means for permitting the user to communicate is a stroke pattern recognition device, and wherein the indicated biocharacteristic is stroke pattern sequence.

6. A system as claimed in claim 5 wherein said stroke pattern recognition device includes pressure sensitive means on which said characters are entered.

7. A system as claimed in claim 5 wherein said verification device includes means for storing an indication of the stroke pattern sequence of the user for each character which may form part of the nonpredictable code, and wherein said means for converting includes means responsive to each generated character for reading out the character stroke pattern sequence indication of the user for the generated character.

8. A method for verifying the identity of an individual comprising the steps of:
    a user device generating a time varying, multi-character, nonpredictable code;
    the individual communicating the unpredictable code generated at a given time to a verification device in a manner such that an indication of a biocharacteristic of the individual is included with each code character; and the verification device generating the same nonpredictable code as is appearing at the user device at the given time, converting each character of the generated code to an indication of the character which includes an indication of the biocharacteristic of the individual, comparing the communicated character indications, including biocharacteristic indications, with the converted character indications including biocharacteristic indications, and indicating verification if the compared characters, including biocharacteristic indications, match in a predetermined way.

9. A method as claimed in claim 8 wherein the communicating step is performed over a voice channel, and wherein the indicated biocharacteristic is voice pattern.

10. A method as claimed in claim 9 wherein said voice channel is a standard telephone line.

11. A method as claimed in claim 8 wherein the communicating step is performed on a stroke pattern recognition device, and wherein the indicated biocharacteristic is stroke pattern sequence.

* * * * *